May 21, 1963 S. G. LEWANDOWSKI 3,090,577
LINE REEL WITH BRAKE
Filed Jan. 31, 1962
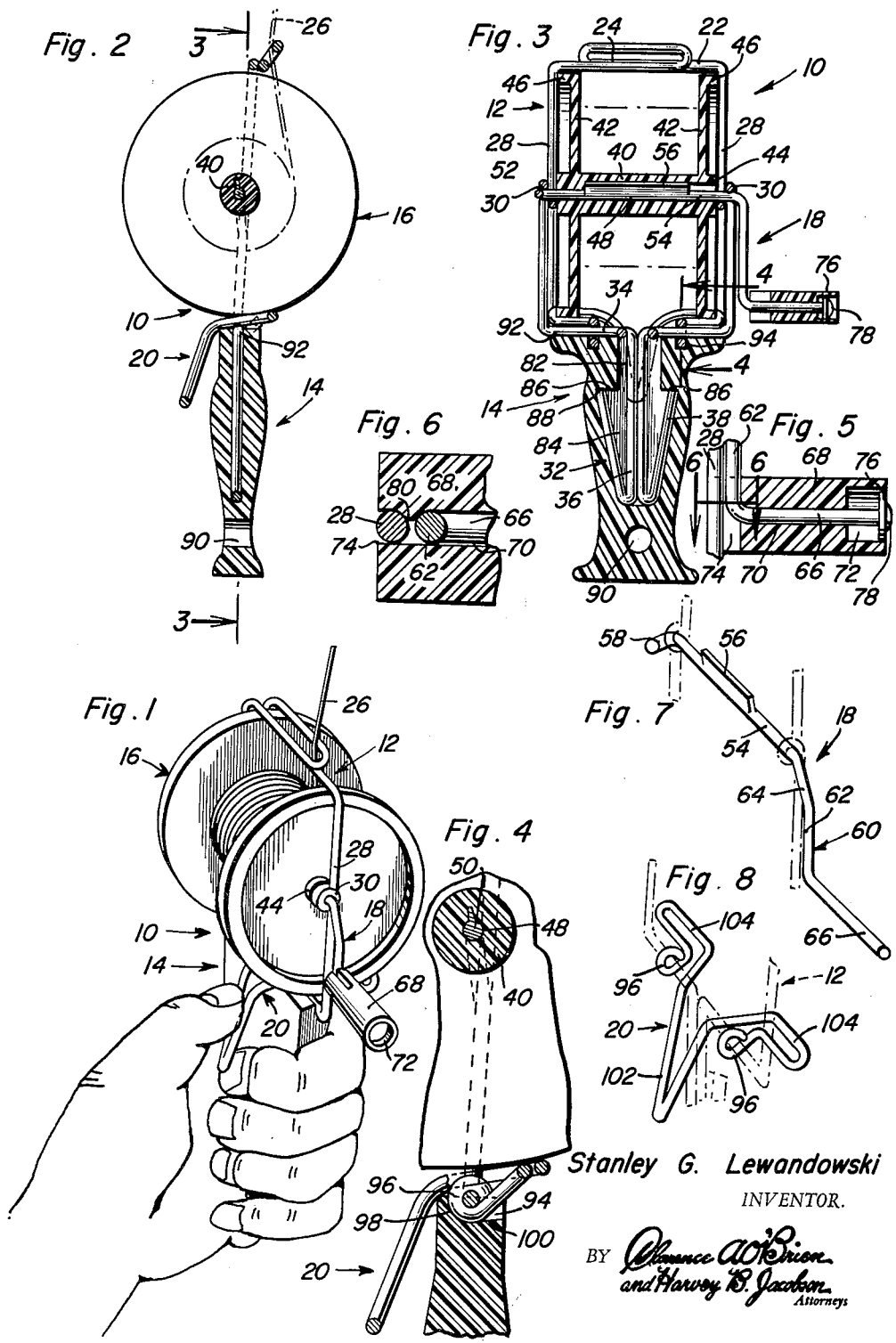
Stanley G. Lewandowski
INVENTOR.
BY *Clarence A. O'Brien*
*and Harvey B. Jacobson*
Attorneys ns patented May 21, 1963

3,090,577
LINE REEL WITH BRAKE
Stanley G. Lewandowski, 4535 Larch St.,
San Diego, Calif.
Filed Jan. 31, 1962, Ser. No. 170,030
8 Claims. (Cl. 242—96)

The present invention generally relates to a line reel, and more particularly to a line reel having a brake mechanism and being capable of use in hand line drop fishing, casting, or kite flying.

One of the primary objects of the present invention is to provide a compact, efficient and safe rodless fishing reel.

Also, an object of the present invention is the elimination of the danger of a whipping spool during rapid unwinding such as is commonly present in the widely used flat spools.

Another object of the present invention is the provision of a highly effective and readily engageable brake mechanism.

A further object of the present invention is the provision of a reel lock which enables the locking of the spool to prevent further movement thereof. This is a particularly useful feature in kite flying as the reel, upon engagement of the lock, can then be attached to a heavy object when the desired height is reached so as to prevent a runaway kite.

Likewise, an object of the present invention is the provision of wide rims on the outer edges of the spool so as to increase the effective braking area.

A further object is the provision of a reel which is inexpensive to manufacture, easy to operate, and highly effective for its intended purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the reel of the present invention illustrating a preferred manner of holding the reel;

FIG. 2 is a sectional view through the reel of the present invention;

FIGURE 3 is a sectional view taken substantially on a plane passing along line 3—3 in FIGURE 2;

FIGURE 4 is a partial section taken substantially on a plane passing along line 4—4 in FIGURE 3;

FIGURE 5 is a partial sectional view illustrating the crank handle in locking engagement with the crank and the reel frame;

FIGURE 6 is a partial cross-sectional view taken substantially on a plane passing along line 6—6 in FIGURE 5;

FIGURE 7 is a perspective view of the crank, illustrating the manner in which the crank is secured to the frame; and FIGURE 8 is a perspective view of the brake mechanism, illustrating the manner of securing the brake mechanism to the reel frame.

Referring now more particularly to the drawings, reference numeral 10 generally designates the reel of the present invention. The reel consists basically of a wire frame 12, a handle 14 mounted on the frame, a spool 16 mounted in the frame, a crank 18 rotatably mounting the spool, and a brake mechanism 20 mounted on the frame for controlling the rotation of the spool 16. While it is generally preferred that the spool 16 and handle 14 be formed of hard plastic, and the frame 12, crank 18 and brake 20 be formed of wire, obviously any other suitable material can be used and still be within the scope of the present invention.

The frame 12, as best seen in FIGURE 3, is formed of a single piece of wire bent into a substantially rectangular shape with the top 22 of the frame 12 formed into an elongated loop 24 which extends at an angle of approximately 45° to the plane of the frame 12 so as to minimize the friction caused by the line 26 passing therethrough. It will be noted that this elongated loop 24 also provides a simple means for level winding of the line 26 on the spool 16 by sideways back and forth movement of the reel 10. The sides 28 of the frame 12 are formed, at approximately the center thereof, into aligned circular loops 30 forming bearing journals for the crank 18. The extremities 32 of the frame 12 first extend inwardly from the side 28 forming the frame bottom 34, and are then bent so as to form downwardly projecting portions 36, and, are finally bent upwardly in a diverging manner so as to form resilient portions 38 capable of being compressed against the downward extending portions 36.

The spool 16 consists of an elongated central portion 40 and two enlarged circular portions 42. The ends 44 of the cylindrical portion 40 project slightly beyond the circular portions 42 so as to properly space the spool 16 within the frame 12. Enlarged rims 46 are formed peripherally around the circular portions 42 so as to provide an enlarged braking area as shall be explained presently. An elongated hole 48 is formed longitudinally through the spool 16 for insertion therethrough of the crank 18. This hole 48 is also provided with a groove 50 extending longitudinally from one end thereof to a point 52 forming an abutment which centers the spool 16 on the crank 18.

The crank 18, as best seen in FIGURE 7, consists of a horizontally extending shaft portion 54 which is adapted to extend through the hole 48 in the spool 16 and as such rotatably mount said spool in the bearing journals 30 of the frame 12. This shaft portion 54 is provided with an upstanding rib 56 which is engaged within the groove 50 and prevents relative movement between the crank 18 and the spool 16. The outer end 58 of the shaft portion 54, upon insertion through the frame 12, is bent at an angle so as to secure the crank 18 within the frame 12. The inner end 60 of the shaft 54 comprises a first portion 62 formed substantially perpendicular to the shaft portion 54 with said first portion 62 being bent, as at 64, so as to enable the alignment of said first portion 62 and the adjacent side 28 of the frame 12 for a purpose which shall be presently set forth. The outer end of the first section 62 is formed into a second section 66 extending substantially parallel to the shaft portion 54 and forming a support for the crank handle 68.

The crank handle 68 is generally cylindrical in shape and has a longitudinally extending hole 70 therein. The handle 68 is also formed with an enlarged recess 72 in its outer end concentric with the hole 70, and a groove 74 formed on its inner end of sufficient depth so as to accommodate both the first crank portion 62 and the adjacent frame side 28. The crank handle 68 is rotatably and slidably secured on the portion 66 of the crank by a washer 76 secured to the end of section 66 by providing an enlarged head 78 on section 66 or, in any other conventional manner. It will be noted from FIGURES 3 and 5, that the washer 76 is of a size so as to allow both the rotating and sliding movement of the handle 68. The groove 74 acts as a locking means by engaging both the sections 62 of the crank 18 and the side 28 of the frame 12 upon inward movement thereof, and as such, prevents relative movement therebetween thus locking the spool 16 in position. If so desired a detent 80 may be provided within the groove 74 so as to provide an additional locking feature as shown in FIG- URE 6. The unique locking feature provided by groove 74 is of particular usefulness when using the reel of the present invention for kite flying as the user thereof can lock the reel when the desired height is reached and then secure the entire reel to a fixed object thus preventing a runaway kite.

The handle 14 consists of an elongated member of greater dimension in its width than in its depth. A hole 82 is formed in the upper portion of the handle 14 and communicates with an enlarged interior space 84 forming opposed abutments 86. Accordingly, the handle 14 is secured to the frame 12 by compressing the portions 38 of the frame against the portions 36 and then inserting the entire end 32 of the frame through the opening 82 and into the interior space 84. Upon clearing the abutments 86 the portions 38 will return to their normal shape and the ends 88 of the portions 38 will engage the abutments 86 thus preventing removal of the frame 12 from the handle 14. Attention is directed to the fact that it is generally preferred that the opening 82 and the space 84 be of a width only sufficient to accommodate the frame ends thus preventing any undesirable movement between the frame 12 and the handle 14. The handle 14, in addition to being of a shape to conform to a hand, is also provided with an aperture 90 for facilitating the securing of the reel of the present invention. A longitudinally extending groove 92 is provided in the top surface of the handle 14 in order to provide a firm seat for the bottom 34 of the frame 12. Additionally, a pair of transverse grooves 94, as best seen in FIGURES 3 and 4, are provided to accommodate the two frame engaging loops 96 on the brake 20. These grooves 94 are provided with a front wall 98 and a bottom wall 100 which limits the rotation of the brake 20 when the brake is not in operation.

The brake mechanism 20 consists essentially of a central forward extending portion 102 and two rearward and outwardly extending portions 104 with the forward and rearward portions being on opposite sides of the frame 12 and pivotally secured to the bottom 34 of the frame 12 by two aligned loops 96 which fit within the grooves 94 of the handle 14. The outward and rearward extending portions 104 are of a length so as to extend beyond the rims 46 of the spool 16. The brake mechanism 20 is activated by depressing the forward extending portion 102 which will cause the brake 20 to pivot about the bottom 34 of the frame 12 which in turn will engage the outwardly extending portions 104 with the enlarged rims 46 of the spool 16 thus providing an effective braking of the spool 16, and accordingly, eliminating any highly undesirable backlash. Of particular significance in regard to this brake mechanism is the fact that the brake can at all times be quickly engaged without requiring any adjustment for the particular amount of line on the spool. This is brought about by specifically providing that the brake mechanism 20 is to engage the spool 16 directly thus at all times enabling the user of the reel of the present invention to be completely aware of just how far the brake mechanism must be moved so as to obtain the desired amount of braking effect.

From the foregoing, it is apparent that a novel rodless reel has been defined which is readily usable for either fishing or kite flying. The above invention, by the provision of a cylindrical spool, has eliminated the danger of a whipping spool which is very common during the rapid unwinding of the more common flat spools. Further, the above invention also provides a novel brake mechanism which is always in the same position for engagement thus insuring a smooth positive action which is particularly of significance in the prevention of backlash. Finally, as noted supra, the reel locking means of the above invention is also a highly desirable feature, particularly when the reel of the present invention is used in kite flying.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A line reel comprising a one piece rectangular wire frame having a top, bottom and two sides, an elongated loop formed in the top of said frame and extending longitudinally of said top, said elongated loop formed at an angle of approximately 45° with the plane of the rectangular frame, a pair of aligned circular loops each at approximately mid-height on the sides of the rectangular frame, means for securing said frame to a frame handle consisting of the two extremities of said frame extending perpendicularly downward from the center of the bottom of the frame, the outer ends of said extremities reversely bent and extending upwardly and outwardly in a diverging manner, a crank comprising a horizontal shaft portion rotatably supported within the aligned circular loops, one end of said shaft extending beyond the frame, said one end bent so as to extend approximately perpendicular to the shaft between the aligned loops and substantially in alignment with the adjacent side of the frame, said end terminating in an outwardly extending portion parallel to the shaft, a handle rotatably and slidably secured on the outwardly extending portion, and a groove through the inner end of the handle of sufficient width and depth so as to accommodate both the perpendicular portion of the shaft and the adjacent side of the frame so as to prevent relative movement therebetween.

2. The combination of claim 1 including a round spool, said spool comprising a cylindrical intermediate portion bounded at each end with an enlarged circular portion, and means fixedly mounting said spool on the portion of the rotatable shaft between the aligned loops.

3. The combination of claim 2 wherein said spool mounting means consist of a circular hole extending longitudinally through the center of the spool, an elongated groove in the wall of the circular hole extending from one end thereof to a point spaced from the other end of said hole, an abutment formed at said point, and a projecting rib on the horizontal portion of the shaft engageable within the elongated groove so as to center the spool on the horizontal portion of the shaft upon engagement of the rib and the abutment.

4. The combination of claim 3 including a brake mechanism pivotally secured about the bottom of the frame and comprising a first portion extending in the same general direction as, but at an angle to the frame handle on one side of the frame, and a second portion consisting of two outwardly extending ends on the other side of the frame, said two ends extending slightly beyond the enlarged circular portions of the spool and being engageable therewith upon pivoted movement of the brake mechanism by depression of the first portion of the brake mechanism toward the frame.

5. A line reel comprising a one piece rectangular wire frame having a top, bottom and two sides, an elongated loop formed in the top of said frame and extending longitudinally of said top, said elongated loop formed at an angle of approximately 45° with the plane of the rectangular frame, a pair of aligned circular loops each at approximately mid-height on the sides of the rectangular frame, means for securing said frame to a frame handle consisting of the two extremities of said frame extending perpendicularly downward from the center of the bottom of the frame, the outer ends of said extremities reversely bent and extending upwardly and outwardly in a diverging manner, the frame handle being provided with an opening in its top of a width so as to accommodate the two extremities of the frame with the reversely bent ends compressed against said extremities, and an enlarged interior space within said handle accessible through said opening, two shoulders formed in the space adjacent said opening, said compressed ends adapted to expand upon introduction into the interior space in a manner so as to abut against said shoulders and lock the frame to the frame handle.

6. A line reel comprising a wire frame having a bottom and two sides, a pair of aligned loops, one located at approximately mid-height on each of said sides of the frame, a crank comprising a horizontal shaft portion rotatably supported within the aligned loops, one end of said shaft extending beyond the frame, said one end bent so as to extend approximately perpendicular to the shaft between the aligned loops and substantially in alignment with the adjacent side of the frame, said end terminating in an outwardly extending portion parallel to the shaft, a handle rotatably and slidably secured on the outwardly extending portion, and a groove through the inner end of the handle of sufficient width and depth so as to accommodate both the perpendicular portion of the shaft and the adjacent side of the frame so as to prevent relative movement therebetween.

7. A line reel comprising a frame having a bottom and two sides, a pair of aligned loops, one located at approximately mid-height on each of said sides of the frame, a crank comprising a horizontal shaft portion rotatably supported within the aligned loops, handle means provided on one end of said shaft portion, a round spool, said spool comprising a cylindrical intermediate portion bounded at each end with an enlarged circular portion, and means fixedly mounting said spool on the portion of the rotatable shaft between the aligned loops, a brake mechanism pivotally secured about the bottom of the frame and comprising a first portion extending in the same general direction as, but at an angle to the frame handle on one side of the frame, said first portion overlapping a portion of said handle, and a second portion consisting of two outwardly extending ends on the other side of the frame, said two ends extending slightly beyond the enlarged circular portions of the spool and being engageable therewith upon pivoted movement of the brake mechanism by depression of the first portion of the brake mechanism toward the handle.

8. A line reel comprising a one piece wire frame having a top, bottom and two sides, means for securing said frame to a frame handle consisting of the two extremities of said frame extending perpendicularly downward from the center of the bottom of the frame, the outer ends of said extremities reversely bent and extending upwardly and outwardly in a diverging manner, the frame handle being provided with an opening in its top of a width so as to accommodate the two extremities of the frame with the reversely bent ends compressed against said extremities, and an enlarged interior space within said handle accessible through said opening, two shoulders formed in the space adjacent said opening, said compressed ends adapted to expand upon introduction into the interior space in a manner so as to abut against said shoulders and lock the frame to the frame handle.

References Cited in the file of this patent
UNITED STATES PATENTS

| | | |
|---|---|---|
| 1,878,041 | Voss | Sept. 20, 1932 |
| 1,982,042 | Basler | Nov. 27, 1934 |